United States Patent [19]
Hopkins

[11] 3,887,061
[45] June 3, 1975

[54] PORTABLE MODULAR MATERIALS DISTRIBUTION SYSTEM

[76] Inventor: Henry R. Hopkins, 7201 92nd St. S.E., Mercer island, Wash. 98040

[22] Filed: Aug. 3, 1972

[21] Appl. No.: 277,818

[52] U.S. Cl. ................... 198/36; 52/581; 52/646; 198/92; 198/101; 198/118; 198/204; 198/208
[51] Int. Cl. ........................................... B65g 65/28
[58] Field of Search .......................... 198/117–126, 198/101, 102, 96, 109, 36, 92, 139, 204, 208, 120.5, 93, 39, 118; 74/579; 212/145; 52/79, 581, 593, 637, 638, 646, 726; 403/13, 14

[56] References Cited
UNITED STATES PATENTS

| | | | |
|---|---|---|---|
| 617,484 | 1/1899 | Haskell | 74/579 |
| 2,788,883 | 4/1957 | Schwenk | 198/208 |
| 2,789,682 | 4/1957 | Laskauskas | 198/95 |
| 2,798,588 | 7/1957 | Jurgen | 198/118 |
| 2,883,035 | 4/1959 | Erisman | 198/56 |
| 2,913,146 | 11/1959 | Dickerson | 198/139 |
| 3,017,012 | 1/1962 | Wilde | 198/100 |
| 3,142,373 | 7/1964 | Pollard | 198/126 |
| 3,273,694 | 9/1966 | Joslin | 198/122 |
| 3,323,660 | 6/1967 | Allin | 212/144 |
| 3,343,651 | 9/1967 | Qury | 198/118 |
| 3,361,248 | 1/1968 | Daymon | 198/92 |
| 3,420,211 | 1/1969 | Hartuickson | 198/126 |
| 3,444,987 | 5/1969 | Palmer | 198/115 |
| 3,563,364 | 2/1971 | Arndt | 198/120.5 |
| 3,596,752 | 8/1971 | Garvey | 198/204 |
| 3,656,607 | 4/1972 | Gorgei | 198/118 |

Primary Examiner—Evon C. Blunk
Assistant Examiner—Jeffrey V. Nase
Attorney, Agent, or Firm—Christensen, O'Connor, Garrison & Havelka

[57] ABSTRACT

A materials distribution system includes generally a plurality of main conveyor spans serially located so that each preceding conveyor is feeding the next succeeding conveyor span. The first of the main conveyor spans is loaded with material, such as earth, to be handled. The main conveyor span feeds a movable distribution conveyor mounted on two motor vehicles. The head section of the movable distribution conveyor is adjustably located under the tail section of the last serially located main conveyor span. The tail of the movable distribution conveyor span can be rotated through an arc greater than 180° while varying the radial distribution distance from the tail section of the last serially located main conveyor span. The main conveyor span and, if desired, the movable distribution conveyor spans are composed of at least one modular conveyor segment including framework and belt-supporting rollers. The main conveyor spans also include a head material receiving section and a tail material dispensing section. The main conveyor spans are preferably supported above the ground by the framework portion of a modular conveyor segment. The modular conveyor segments, tail sections and head sections have quickly connectable and reversible couplings to provide portability, ease in assembly and disassembly. A simplified control system for the serially located main conveyor spans is also disclosed.

14 Claims, 15 Drawing Figures

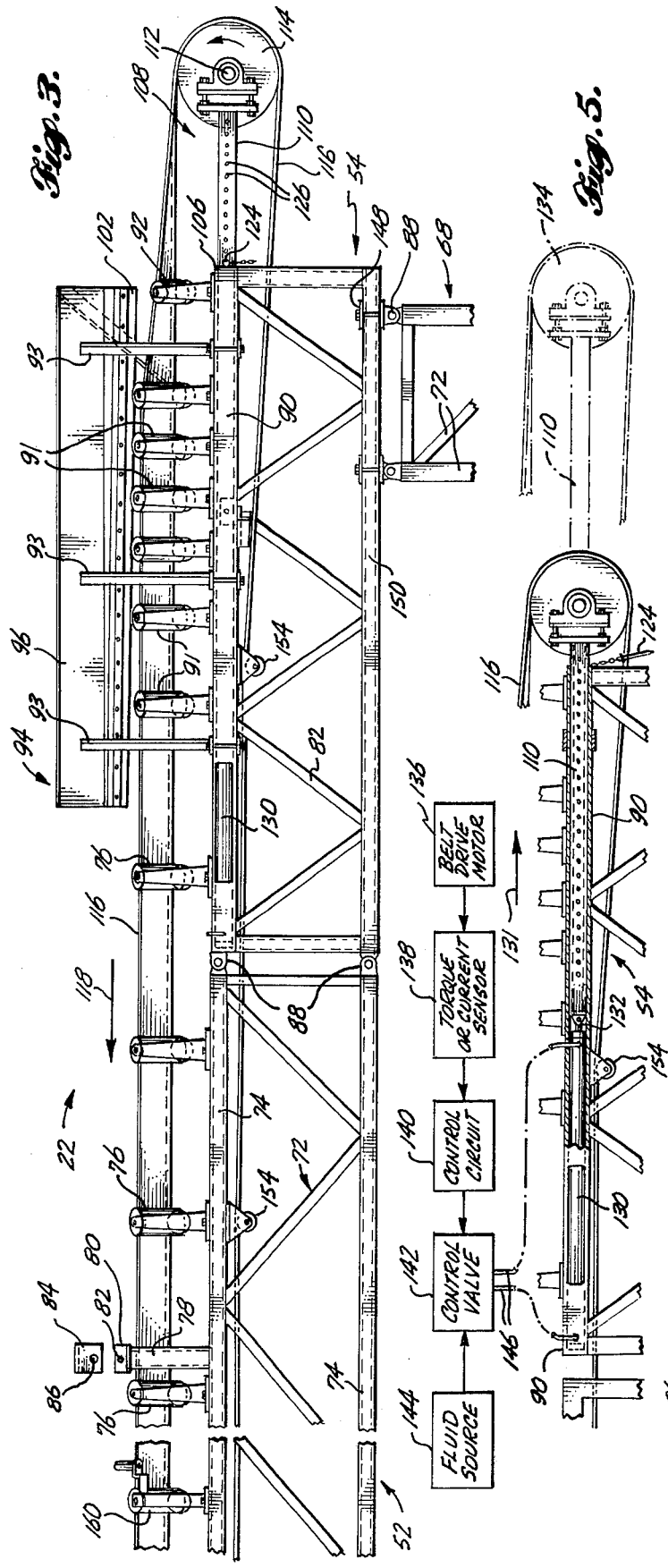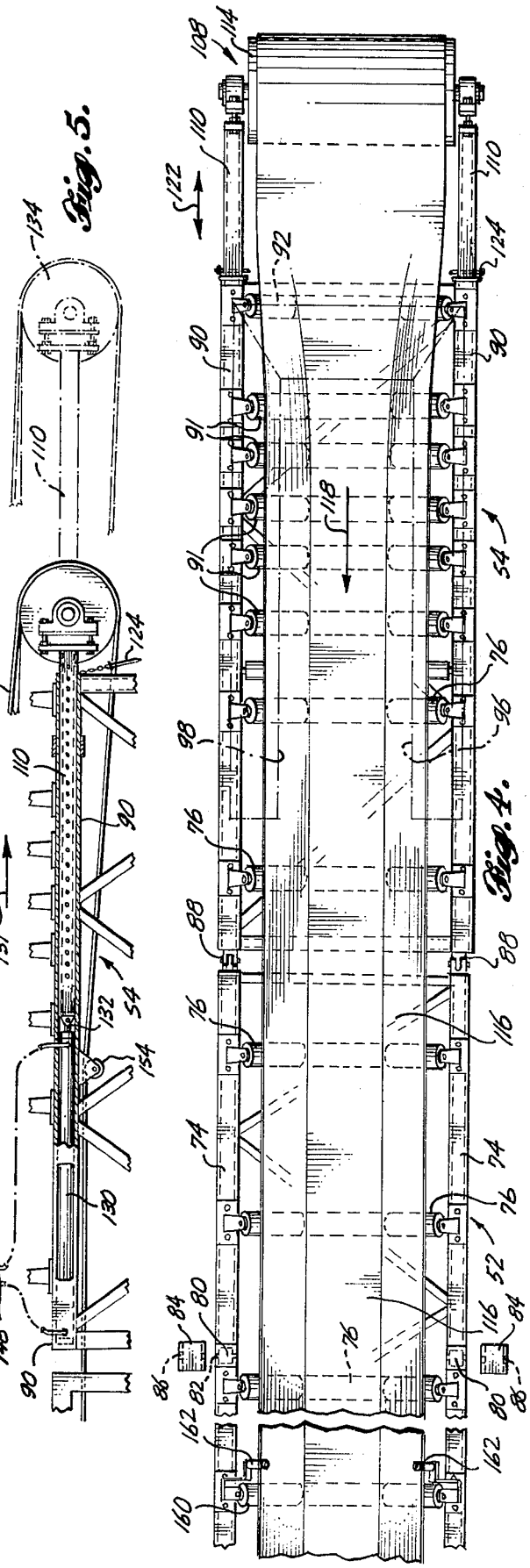

PATENTED JUN 3 1975 3,887,061
SHEET 3
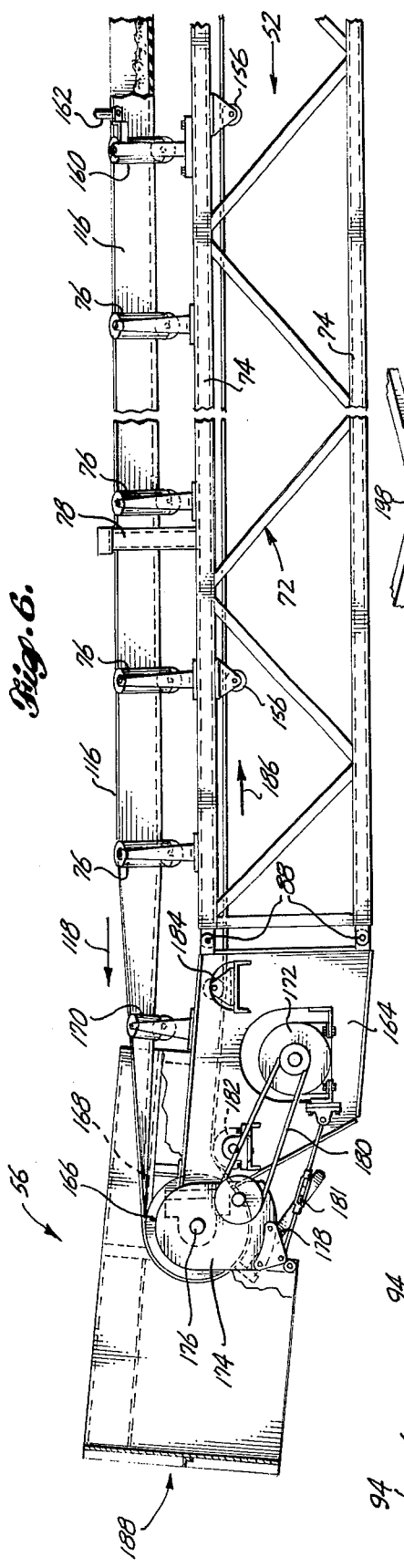
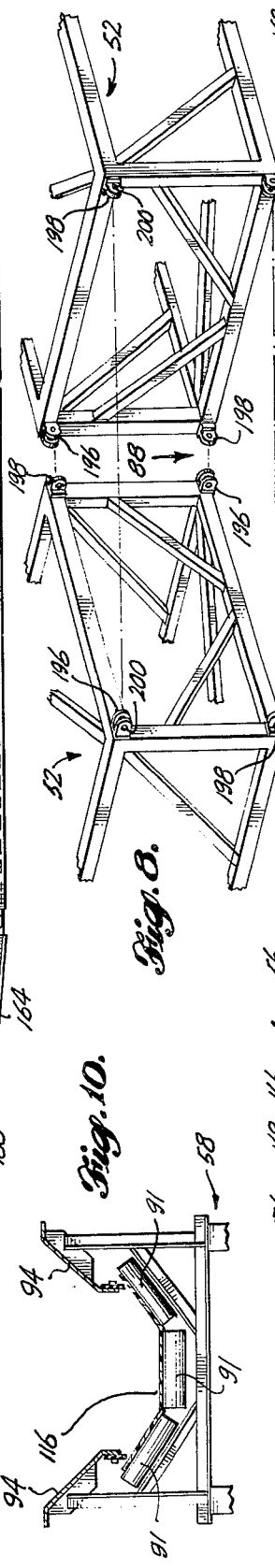
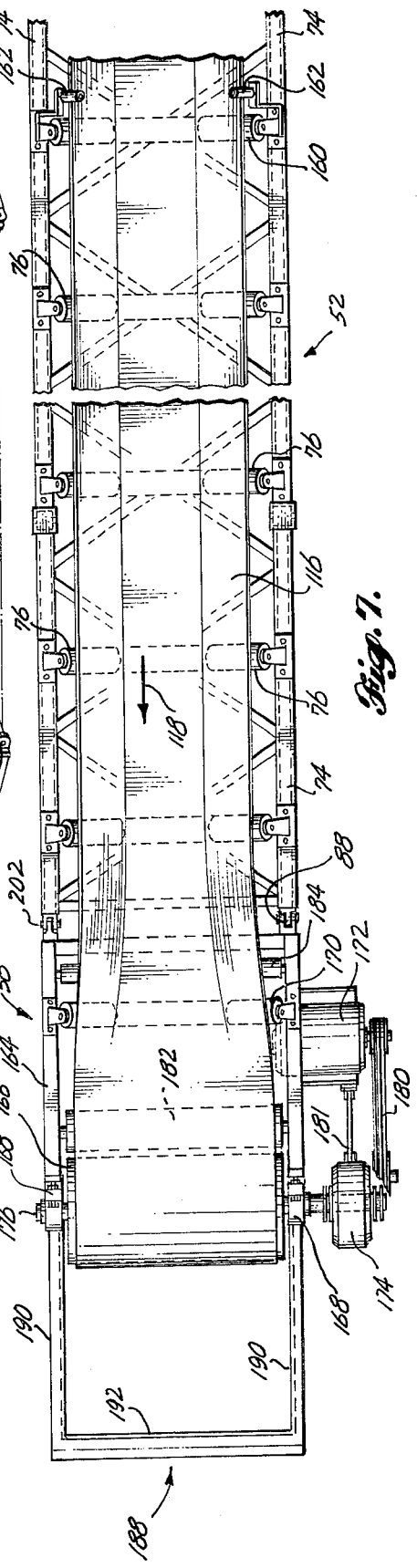

PATENTED JUN 3 1975 3,887,061
SHEET 4
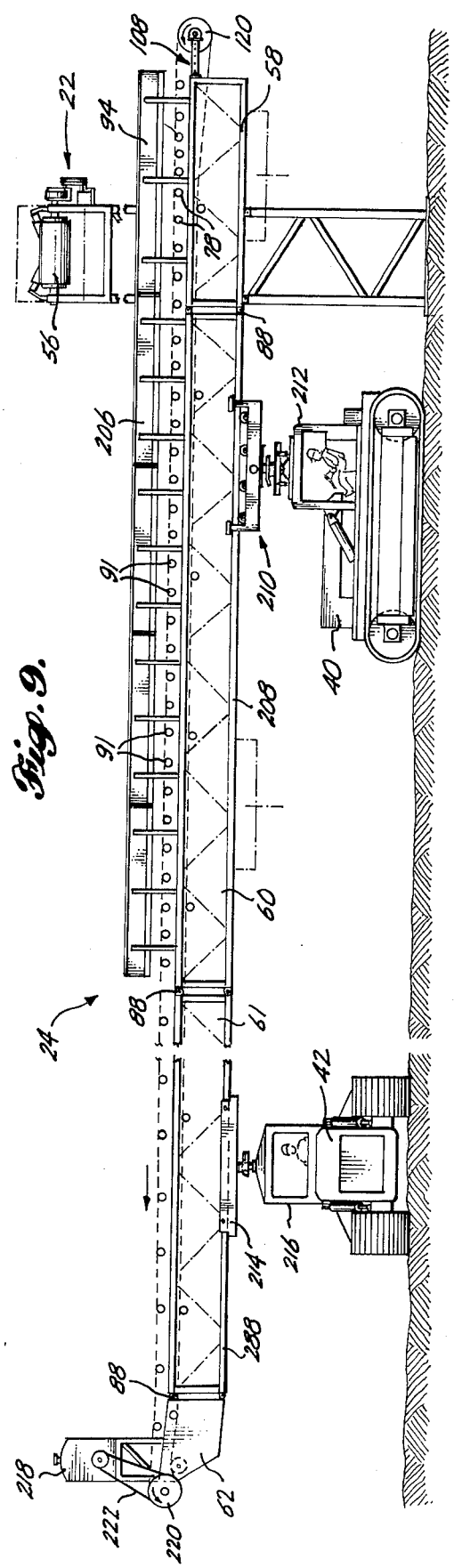
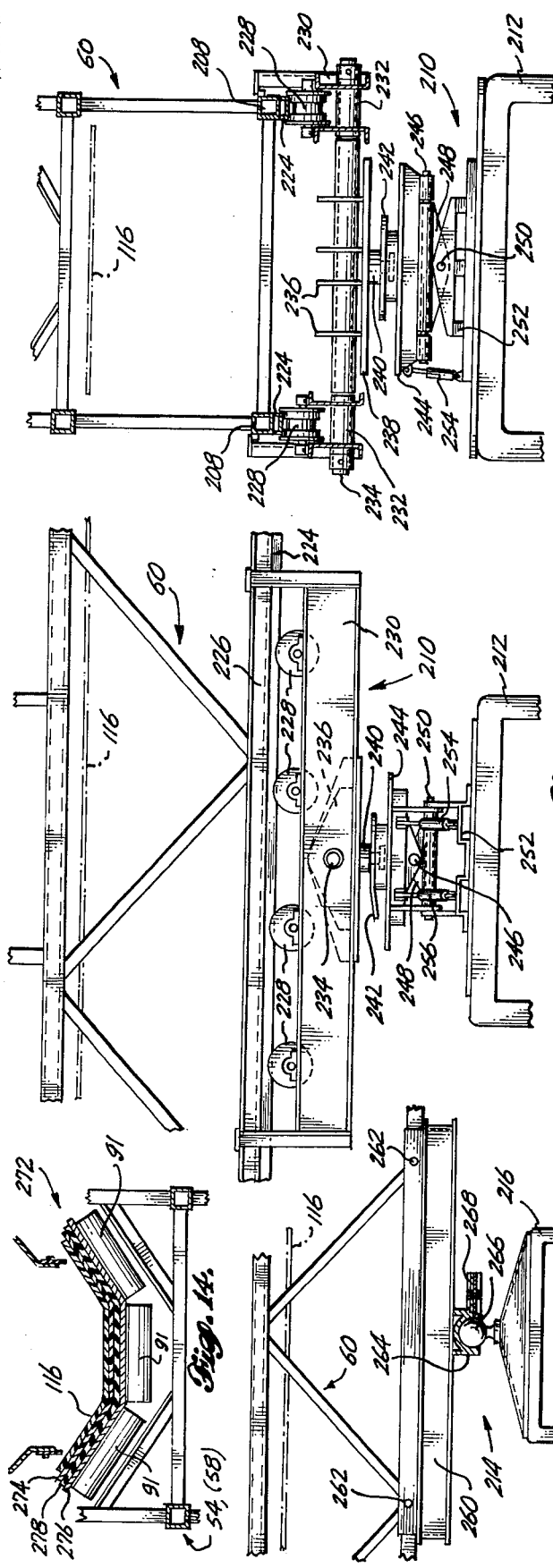

PORTABLE MODULAR MATERIALS DISTRIBUTION SYSTEM

BACKGROUND OF THE INVENTION

This invention relates to conveyor systems, and more particularly to a portable modular conveyor system for large scale materials handling.

Heretofore the construction industry has been presented with the problem of moving large amounts of landfill for interstate highway grades and the like. Generally, the landfill or grade build-up material is removed from a location remote from the grade. Oftentimes the remote location is ½ mile, 1 mile or sometimes a much greater distance from the location of the grade being built. The problem of landfill and grade build-up thus presents a monumental materials handling problem.

Prior to this time grade build-up has been accomplished through the use of vehicular earth moving machines. Vehicular earth moving machines presently available have a limited capacity, for example, in the range of 10-30 cubic yards of material. Since building up grades requires the movement of fill on the order of millions of cubic yards, many such earth moving vehicles are necessary to accomplish a given job within a reasonable time span. Many earth moving vehicles represent a relatively large investment in capital equipment with a short life span. Furthermore, operations are necessary for each of the earth moving machines employed on the job site.

In addition, may grade build-up sites are located in relatively polulous areas or in areas where other right-of-ways, such as for existing highways, railroads and the like, are present. Since present earth moving machines are land vehicles, they must cross the existing right-of-ways many times to reach the build-up site from the remote location at which the fill is being obtained. When the vehicles cross existing right-of-ways, traffic congestion and timing problems occur. Furthermore, it is inevitable that some of the fill material will spill from the earth moving vehicles as they cross the right-of-ways, necessitating constant clean-up of highways, railroad crossings and the like. Flagmen and look-outs are also needed and must be posted at the right-of-way crossings to control traffic. Since generally the vehicular traffic on the existing right-of-ways will have priority, time delays are introduced when an earth moving vehicle must wait for existing traffic to pass.

It is also oftentimes necessary to build separate roads for the earth-moving vehicles from the remote fill location to the grade build-up location. Such roads must also generally include a high quality fill operation since the earth moving vehicles are quite heavy and thus require a solid base upon which to operate. Construction of such roads and of access ramps over existing right-of-ways also require considerable time and expense. Heretofore, other earth moving or materials handling systems have not been considered, since for the most part they are impractical or more expensive than the existing vehicular system utilized. For example, fixed conveyor systems have been considered. Existing conveyor systems, which have the capacity to handle the large amounts of material encountered in grade build-up work, are relatively large, heavy, very expensive and also are designed for permanent installation. It is of course readily apparent that prior art conveyor systems are not adaptable to grade build-up operations since they must readily disassemble, must have the ability to move from job site to job site and must have the capability of growing as the grade build-up location recedes from the remote location at which fill is being obtained.

It is an object of the present invention to provide a materials handling system which does not employ vehicular traffic for the primary movement of the material. Further objects of the invention are: to provide a materials handling system of the conveyor type; to provide a modular materials handling system to facilitate assembly and disassembly; to provide a materials handling system which has the capability to handle large amounts of material in a relatively short time; to provide a materials handling system which will not interfere with the use of existing highway, railroad and other right-of-ways; to provide a materials handling system which when capitalized is less expensive than vehicular material handling systems; to provide a materials handling system which can be expanded or contracted as the particular job dictates; to provide a materials handling system with great flexibility to adapt to varying types of materials handling jobs, to provide a materials handling system which is relatively inexpensive to operate and maintain; to provide a materials handling system which can eliminate manual and operator labor; to provide a materials handling system which accomodates a continuous flow of material from a remote location to the fill site.

Further objects of the invention are: to provide a modular conveyor segment which can be utilized for supporting a conveyor belt and which can be utilized for supporting conveyor spans above the ground and particularly above existing right-of-ways; to provide modular conveyor segments which are easily connected and disconnected from one another; to provide a modular conveyor segment which is designed to support both a longitudinal load and an axial load; to provide a modular conveyor segment which can be coupled to a similar modular conveyor segment with ease and without predetermined positioning; to provide modular tail and head sections for connection to a modular conveyor segment; to provide means for adjusting the belt tension on a modular conveyor span; to provide an automatic system for belt tensioning on a modular conveyor span; to provide modular tail and head sections which are adapted to readily receive and distribute material from one another; and to provide a remote control system for a plurality of main conveyor spans.

Still further objects of the invention are: to provide a modular distribution conveyor span to receive material from the main conveyor span and distribute the material over a relatively large area; and to provide a movable distribution conveyor span which is mounted on a ground-engaging vehicle, to provide a movable distribution conveyor span which can distribute material over an arc greater than 180° from the end of the main conveyor span.

SUMMARY OF THE INVENTION

The present invention therefore provides a modular conveyor system comprising a main conveyor span including a primary conveyor section formed from at least one modular conveyor segment, the conveyor segment including framework means for support, each segment carrying a plurality of sets of belt-supporting rollers, a head section removably connected to one end of the primary section, said section having at least one set of belt-supporting rollers and having a belt return idler roller mounted on the end thereof, a tail section removably connected to the other end of the primary section, the tail section having at least one set of belt-supporting rollers and having a belt drive roller mounted on the end thereof, a continuous flexible belt engaging the belt idler roller on the head section and the drive roller on the tail section, the belt resting on the belt-supporting rollers, means for supporting the primary, tail and head sections and means for driving the belt drive roller.

The invention further provides a modular conveyor trestle section comprising a plurality of rectangular trusses of substantially equal length having their elongate sides joined together, the ends of the trestle sections lying substantially in a plane perpendicular to the plane of the trusses, coupling means at the end corner junctions of each of the trestle sections, the coupling means being of a first type on a given corner and being of an opposite type of the corresponding longitudinally opposite end corner, the coupling means capable of mating with each other to join together a plurality of the trestle sections to form an integrated conveyor trestle, a plurality of belt-supporting roller means mounted on one side of the trestle section.

The present invention further provides a modular conveyor head section comprising a trestle composed of a plurality of rectangular trusses of substantially equal length having their elongate sides joined together, one end of the trestle section lying substantially in a plane perpendicular to the plane of the trusses, coupling means on the one end for joining the head section to a modular conveyor trestle section having corresponding coupling means thereon, a longitudinally extensible bracket mounted on the other end of the trestle, a belt-return roller mounted for rotation on the outboard end of the bracket, means for restraining the bracket in a plurality of longitudinally extended positions, and a plurality of belt-supporting roller means mounted on one side of the trestle for carrying the belt from the belt roller.

The invention further provides a modular conveyor tail section comprising a frame having coupling means on one end thereof for joining the tail section of a modular conveyor trestle section having corresponding coupling means thereon, a belt drive roller mounted for rotation on the other end of the frame, prime mover means mounted on the frame for driving the drive roller, an idler belt-supporting roller mounted for rotation on the frame downwardly and inwardly from the belt drive roller and having its axis parallel to the axis of the belt-drive roller, the idler roller mounted such that the upper portion of its circumference is above the bottom portion of the circumference of the belt drive roller.

BRIEF DESCRIPTION OF THE DRAWINGS

A better understanding of the present invention can be acquired by reading the ensuing specification in conjunction with the accompanying drawings, wherein:

FIG. 3 is an enlarged side elevation view of a portion of a modular conveyor segment and of a head section employed with the conveyor of the present invention;

FIG. 4 is a plan view of the modular conveyor sections illustrated in FIG. 3;

FIG. 5 is a view of the belt adjustment means on a head section;

FIG. 6 is a greatly enlarged elevation view of a portion of a modular conveyor segment and of a tail section employed with the conveyor of the present invention;

FIG. 7 is a plan view of the modular conveyor sections shown in FIG. 6;

FIG. 8 is an isometric view showing the connecting means on the modular conveyor sections and manner of connection;

FIG. 9 is an enlarged elevation view of the movable distribution span of the present invention;

FIG. 10 is a cross-sectional view of FIG. 9 taken along section line 10—10;

FIG. 11 is an enlarged view of one support means for the movable distribution span of FIG. 9;

FIG. 12 is an end view of the apparatus shown in FIG. 11;

FIG. 13 is an enlarged elevation view in partial cross section of another support means for the movable distribution span shown in FIG. 9;

FIG. 14 is a preferred belt supporting method for the material receiving head of the conveyor spans.

DESCRIPTION OF THE PREFERRED EMBODIMENT

Figure 1:
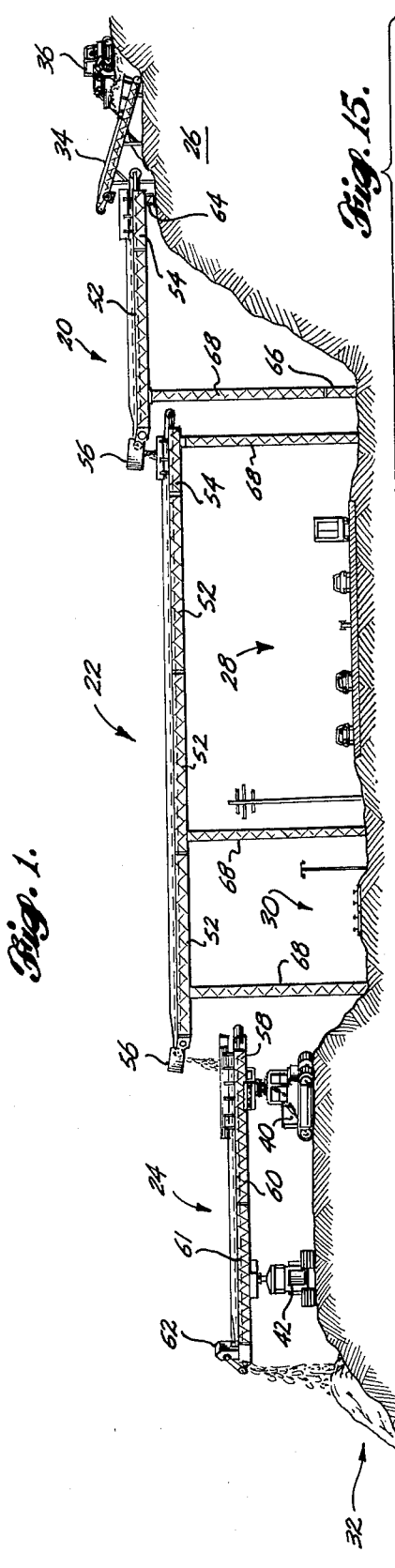
FIG. 1 is an elevation view of the conveyor system of the present invention.

Referring to FIG. 1 an overall elevation view of the conveyor system of the present invention is illustrated. Basically, the conveyor system of the present invention includes a first main span generally designated 20, a second main span, generally designated 22, and a movable distribution span 24, hereinafter referred to as a swinger. As shown, the conveyor system of the present invention is utilized to move grade fill material from a mound or hill location 26 across a highway right-of-way 28 and a railroad right-of-way 30 to a grade location 32. In this example the grade location is for a freeway. For use with the present invention, any suitable conventional or other excavating system can be employed. In the embodiment shown, a loading conveyor 34 is being filled by means of a bulldozer 36 scraping fill material from the hill 26 into the conveyor 34. The fill travels down the first main span 20 into the second main span 22 and drops onto the swinger 24 for distribution across onto grade 32.

Figure 2:
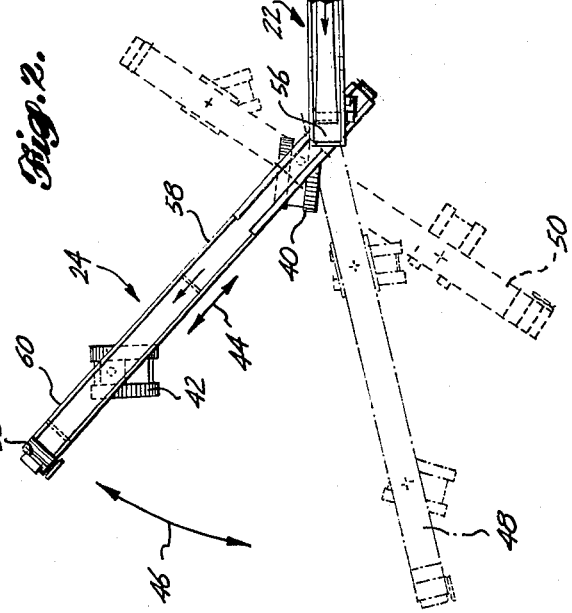
FIG. 2 is a plan view of the movable distribution conveyor span of the present invention.

As shown in FIG. 2, and as will be described later in detail, the swinger 24 has the capability of distributing material from its tail section 38 over a relatively wide area. The swinger 24 is preferably mounted on a pair of tracked vehicles 40 and 42, for example conventional bulldozers with a load-bearing attachment means over the operator's platform. By movement of the bulldozers 40 and 42, the swinger 24 can distribute large amounts of material over a relatively large area. The means attaching the swinger 24 to the bulldozers 40 and 42 provide for longitudinal movement of the swinger 24 in the direction of arrow 44 and also provide for rotational movement in the direction of arrows 46 to exemplary positions 48 and 50 shown in ghost outline. Any suitable distribution system can be utilized in substitution for or in combination with the swinger 24. For example a vehicle mounted auger system can be utilized to longitudinally translate along a grade 32 to evenly distribute a uniform layer of material onto the grade. Such a distribution system can also be used in conjunction with a swinger 24 for supply of material thereto.

Each of the main conveyor spans 20 and 22 are composed of modular conveyor segments 52. Furthermore, each of the main conveyor spans has a head section 54 and a tail section 56. The head section 54 is designed for receiving material from above whereas the tail sections 56 are designed to distribute material to a next succeeding lower conveyor section. The swinger 24 is composed of a head section 58 of slightly different construction than the head section 54, modular conveyor sections 60 and 61 and a tail section 62.

The first main conveyor span 20 is supported at one end on a base member 64 and is supported at its other end in part by a base member 66. The pedestal 68 supporting the conveyor span 20 down to the base member 66 includes, preferably, the framework for one of the modular conveyor segments 52. The only differences between the conveyor segments 52 and the pedestal 68 are that the belt-supporting means and associated electrical cables are not employed on pedestal 68. However, if desired, the entire modular segment 52 can be substituted for the pedestal 68. Likewise main conveyor span 22 is supported by similar pedestals 68 above the highway right-of-way 28 and the railroad right-of-way 30.

Referring now to FIGS. 3 and 4 a portion of one of the modular conveyor segments 52 is illustrated connected to a head section 54. The head section is shown supported by a pedestal 68 which comprises the framework or trestle of modular conveyor segment 52. The modular conveyor section 52 is preferably of rectangular cross section. Each one of its sides comprises a rectangular truss 72 which has common side rails 74. The plural trusses 72 joined together as illustrated form a trestle of rectangular cross section. In a preferred form of the invention each of the modular segments 52 is 40 feet long, approximately 4 feet high and 5 feet wide. Mounted on top of the trestle are a plurality of sets of belt-supporting rollers which are mounted for rotation of an angle of 35° with the horizontal and an interior roller 76 mounted for rotation about a horizontal axis.

A support riser 78 is also mounted on the upper side rails 74. A cap 80 with a hole 86 therethrough is fastened to the top of riser 78. Riser 78 and cap 80 are designed to support in stacked relationship an identical conveyor segment 52 for transportation. A U-shaped clamp 84 with a mating hole 86 is provided for attaching one modular conveyor segment 52 on top of another during transportion.

The head section 54 is also composed of four sets of trusses 82 which are joined together to form a trestle of rectangular cross section. The head section 54 is removably connected to the modular section 52 by the couplings 88, which will be described in detail below. The two upper rails 90 of the head section 54 are preferably square tubes. The upper rails 90 support a set of rollers 76 similar to those on the modular segment 52. Additionally, a plurality of sets of impact rollers 91 are mounted on the top of the bars 90. The sets of rollers 76 and 91 have side rollers mounted on 35° and a center horizontal roller. The end set of impact rollers 92 have a horizontal roller and two side rollers. The side rollers are mounted at an angle of 20° from the horizontal. End set of rollers 92 provide for a gradual channeling of the belt from the idler roller 120 to the impact rollers 91. Standards 93 are suitably fastened to the top of the rails 90 and support transfer boards 94. The transfer boards 94 are of conventional design and include two longitudinally extending boards 96 and 98 and a laterally extending end transfer board 100. Adjustably connected to the bottom of the transfer boards 96, 98 and 100 are vertically adjustable rubber strips 102 which extend downwardly from the transfer boards 96, 98 and 100.

Top rails 90 have an open end 106 into which is inserted a longitudinally adjustable idler roller bracket 108. Idler roller bracket 108 includes two longitudinally slidable bars 110 which mate and slide within the interior of square rails 90. A pair of bushings 112 are mounted on the ends of the bars 110. Idler roller 114 is journaled in the bushings 112. An elongate continuous flexible belt 116 engages the idler roller 76, the impact rollers 91 and the belt-supporting rollers 76. The belt preferably travels in the direction of arrow 118 causing the idler roller to rotate in the direction of arrow 120. To adjust the tension of belt 116 the bracket 108 is moved in the direction of arrows 122. A pin 124 is provided to mate with the plurality of holes 126 in each of the bars 110 and rest against the end of rail 90 to retain the bracket 108 in a desired extended position.

In one embodiment of the invention, the bars 110 can be extended outwardly to increase the tension on belt 116 by inserting a jack between the end of the head section and the bushings 112. Preferably, as shown in FIG. 5, a hydraulic cylinder 130 is mounted on the interior of the upper rail 90. The rear end of the cylinder 130 is securely fastened within the rail 90. The piston rod 132 on the cylinder is connected to the rear end of the extensible bar 110. When hydraulic fluid is supplied to the cylinder 130 in a first direction the bar 110 will extend outwardly to the position 134 shown in ghost outline. Likewise, when hydraulic fluid is supplied to the cylinder 130 in the opposite direction, the bar 110 will be retracted to the retracted position shown. Pin 124 is provided if it is desired to lock the bracket 108 in any given position to relieve the pressure in hydraulic lines supplying the cylinder 130.

Also shown in FIG. 5 is a control system for the hydraulic cylinder 130. As will be described in detail later, the preferred prime mover for the conveyor belt is an electric motor. As the load on the belt 116 varies, the current to the electric motor will vary. As shown in the diagrammatic portion of FIG. 5, the current to drive motor 136 is measured by a current sensor 138. Alternatively the output torque of the motor can be measured. The current sensor feeds a signal to a control circuit 140 which conditions the signal to control a hydraulic valve 142. Valve 142 meters the flow from a fluid source 144 through hydraulic lines 146 to hydraulic cylinder 130. As the load on the belt 116 increases, the current in the motor 136 will increase. The sensor 138 will transmit a signal to the control circuit 140 which in turn will cause control valve 142 to supply more hydraulic fluid to the cylinder 130 in a first direction. So admitting hydraulic fluid to the cylinder 130 will cause extension of the idler roller bracket 108 in the direction of arrow 131 to tighten the belt 116. The converse is true when the load on the belt 116 is lessened or decreased. In this manner the life of the belt can be greatly increased by reducing the tension thereon during periods of light load. Likewise, when a heavy load is being carried by the belt 116 the tension is increased, thus increasing the drive friction and preventing slippage between the drive roller and the belt 116.

As shown in FIG. 3, the pedestal 68 comprises a standard modular trestle section composed of four trusses 72. Adapter brackets 148 connect to the bottom rail 150 of the head section 54 and connect to the couplings 88 normally utilized to interconnect the modular conveyor segments 52. In this manner the same basic trestle utilized for the modular segment 52 can be utilized to vertically support the entire conveyor span.

The belt 116 is also supported to return interior of the head section 54 and modular conveyor segments 52. At least one set of belt-supporting rollers 154 are provided in each of the conveyor sections to prevent the belt from contacting a portion of the interior of the sections.

Referring to FIG. 6 a second modular conveyor segment 52 is shown. This conveyor segment 52 is identical in construction to that shown in FIG. 3. It will be noted that the left half of a segment 52 is shown in FIG. 6 whereas the right half of a segment 52 is shown in FIG. 3. A second support riser 78 is provided on the left half of the conveyor segment 52 to support identical conveyor segments in stacked relationship for transporation. Similar identical trusses 72 are utilized and are formed from upper and lower rails 74. The belt-supporting return rollers 156 are mounted on these bars 74. Similarly, belt supporting rollers 76 are mounted on the top of the rails 74. Each modular conveyor segment 52 has at least one set 160 of self-centering belt-supporting rollers. These sets of self-centering rollers pivot about a central vertical axis to realign the belt 116 over the remaining support roller 76. Self-centering roller sets 160 have a small roller 162 mounted along rotational axis perpendicular with those of the side rollers of the sets 160 which contact the edges of the belt 116. Such self-centering roller sets 160 are commercially available.

Couplings 88 on the left end of the modular segment 52 connect to a tail section 56. Tail section 56 is composed basically of a frame 164 having mating coupling units 88 at one end. Frame 164 carries a drive roller 166 mounted for rotation in a set of bearings 168. Belt 116 engages the drive roller 166 for traverse in the direction indicated by arrow 118. Between the left-hand belt supporting roller 76 on the modular segment 52 and the drive roller 166 is another set 170 of belt supporting rollers. The side rollers of the set 170 are mounted at an angle of 20° with the horizontal similar to the side rollers of end set 92 on the head section 54. Thus the belt 116 is allowed to gradually channel to a flat configuration as it engages the roller 166.

Electic motor 172 is also mounted in the frame 164. Electric motor 172 drives a reduction gear set 174 mounted on the shaft 176 of the drive roller 166. A bracket 178 holds the gear set 174 in position. In this embodiment of the invention a V-belt drive 180 is utilized between the input pulley of the gear set 174 and the output pulley of the motor 172. As can be seen the bracket 178 is adjustable by means of turn buckle 181.

An idler roller 182 is mounted in a pair of bearings attached to opposite sides of frame 164. Idler roller 182 is mounted downwardly and inwardly of the drive roller 166. However, the upper peripheral surface of idler roller 182 is positioned above that of the bottom peripheral surface of drive roller 166. Belt 116 is thus caused to wrap greater than 180° around the drive roller 166, providing maximum frictional contact between the interior of belt 116 and the drive roller 166. A second idler roller 184 is also journaled in bearings on frame 164 to engage the inside of belt 116 as it travels in the direction of arrow 186 to the first set of return rollers 154 on the modular segment 52.

A shroud 188 is attached to the outer end of the frame 164 of the tail section 56. Shroud 188 has two side members 190 and end member 192. The material being handled by the belt 116 is restrained from sideward or outward motion by the shroud 188 and is directed downward onto a next conveyor span or onto the swinger.

Referring now to FIG. 8 the ends of two modular conveyor segments 52 are shown, for purposes of illustrating the coupling 88. Yoke members 196 are mounted on diagonally opposing ends of the modular segment 52. The same modular segment 52 has flange connecting members 198 connected to the longitudinally opposite ends thereof. Likewise the opposing diagonal ends of the segment 52 contain flange members 198 while the longitudinally opposite ends contain yoke members 196. Thus when two segments 52 are placed in one end to end relationship, the flanges 198 will mate with the yoke members 196. Thus the conveyor segments can be connected together in end to end relationship from a variety of orientations, i.e., they can be mated when rolled about a longitudinal axis or can be mated when they are turned about a vertical axis. Each of the flange members 198 and yoke members 196 have mating apertures 200 through which a connecting pin is inserted. The connecting pin, or bolt if desired, can be utilized to secure the flange 198 to the yoke 196. An exemplary pin 202 is shown in FIG. 7 connecting a modular segment 52 to a head section 56. It is to be understood that the tail sections 56 and the head sections 54 each have similarly arranged and constructed flanges 198 and yokes 196 on one end thereof so that the head and tail sections can be conveniently connected to either end of a modular conveyor segment 52.

Referring now to FIG. 9 an enlarged view of the swinger 24 is illustrated. As shown, swinger 24 includes two modular conveyor segments 60 and 61, a head section 58 and a modified tail section 62. Tail section 56 of a main conveyor span 22 empties material into the head section 58. The segments 60 and 61 are constructed very similarly to the standard modular segments 52. The head section 58 is identical in construction to the head sections 54 utilized on the main conveyor spans. Head section 58 has a trestle portion and an adjustable bracket 108 which carries an idler roller 114. Transfer boards 94 are mounted on the top of the head section 58. The head section 58 may have, if desired, a series of impact rollers 91 running the entire length of the head section 58.

Modular segments 60 and 61 have a trestle constructed identically to that of the primary modular segments 52. Segment 60 has a series of transfer boards 206 mating with the transfer boards 94 on the head section 58 which run substantially the entire length of the segment 60. A plurality of sets 91 of impact rollers replace the conventional belt supporting rollers utilized on the main modular segment 52. Modular segment 60 has a bottom rail 208 which mates with the carriage support 210. Carriage support 210 is mounted on a suitable support bracket 212 in turn mounted on a conventional bulldozer 40.

The second modular segment 61 utilized in the swinger 24 does not have transfer boards attached thereto and is substantially identical to the primary modular segments 52. The segment 61 is supported by a support member 214 in turn mounted on a suitable support 216 on a conventional bulldozer 42.

The tail section 62 of the swinger 24 is substantially the same as the tail sections 56 utilized on the primary conveyor span, except that it is preferred that an internal combustion engine 218 is mounted on the framework of the tail section 62. The engine 218 drives the idler roller 220 by a belt drive system 222 or other suitable transmission means.

Head section 58 is coupled to modular segment 60 by the same type of coupling means 88 as utilized in the main spans. Likewise the remainder of the sections 60, 61 and 58 are similarly interconnected.

Referring to FIGS. 12 and 13, enlarged elevation and end views of the carriage 210 are shown. Rail 224 is mounted on the bottom side of the trestle rails 208 of the modular segment 60. Rails 224 are supported by a plurality of wheels 228 journaled in a top frame member 230. Top frame member 230 includes two pairs of longitudinal channels which are in turn firmly attached to tube segments 232. A rod 234 extends through the tube 232 and is connected to a series of flanges 236. Thus, frame 230 is connected to flanges 236 in turn supported by a plate 238. Thus, the modular segment 60 is supported for rotation about a lateral axis on the plate 238. Plate 238 has a spindle 240 pivotally connected with a fifth wheel structure 242 in turn mounted on another plate 244. The fifth wheel structure 242 mounts the carrier segment 60 for pivotal movement about a substantially vertical axis. The conveyor segment 60 is allowed to pivot freely about the rod 234 and on the fifth wheel 242 without restraint.

Plate 244 is mounted by means of an adjustable mechanism to the support 212 in turn connected to the bulldozer 40 (FIG. 9). The adjustable mechanism includes a first pivotal connection 246 connecting the plate 244 to member 248. Member 248 is in turn pivotally connected at 250 to a bottom member 252 attached to the support 212. A pair of hydraulic cylinders 254 and 256 are interconnected between the plate 252 and the plate 244. By simultaneous extension of the cylinders 254 and 256, the plates 238 and 244 will be tilted about an axis which is typically longitudinal to the conveyor segment 60 as shown in this view. Likewise by differential extension of the cylinders 254 and 256, the plates 238 and 244 will be tilted about an axis typically lateral to the conveyor segment 60 as shown in this view. The lateraal adjustment is necessary if the opposite end of the swinger 24 is operating on either a much higher or much lower slope than that on which the bulldozer 40 is situated. It is understood that conventional hydraulic valves can be utilized to control the cylinders 254 and 256.

FIG. 13 illustrates the front supporting member 214. The front conveyor segment 61 is mounted on a bracket 260 along its bottom trestle rail 208 by means of pins 262. A large socket 264 is mounted on the bottom central portion of the plate 262. A ball 266 is inserted into the socket 264 and is retained there by means of a removable flange 268. The ball 266 is mounted on suitable support structure 216 in turn mounted on a bulldozer 42. (FIG. 9) Thus, the tail end of the swinger 24 can move with respect to its support structure 216 in all directions simultaneously in roll, pitch and yaw. No provision is made for longitudinal movement of the support structure 216 and the swinger 24 since longitudinal movement is provided for in the head end support carriage 212. Thus it can be seen that the swinger 24 provides great flexibility for distributing material from the main conveyor span 22.

In a preferred form of the invention illustrated in FIG. 14 an impact surface, generally designated 272, is provided on top of the impact rollers 91 at the rear of the head sections 54 of the main conveyor spans and the head sections 58 of the swinger 24. Likewise the transfer surface 272 can be utilized on the modular segment 60 along the entire length.

The impact surface 272 includes an upper layer 274 of material, preferably a wear-resistant, low-friction coefficient synthetic polymeric material, such as a polyvinyl urethane. A bottom steel layer 276 is secured on the impact rollers 91. Alternatively, the steel plate 276 can be mounted directly to the head section 54 or 58. It will be noted that the impact surface 272 conforms to the desired belt positioning. A layer 278 of resilient material such as rubber is interposed between the steel plate 276 and the low friction layer 274. Layer 278 prolongs the life of the plastic sheeting and also cushions the impact of material falling on belt 116. The material 274 with a low coefficient of friction directly supports the sliding motion of the belt 116 over the major portion of the head section span. The impact surface 272 can be utilized as shown here by positioning it on top of the impact rollers, or can preferably be directly mounted on the framework of sections 54, 58 and 60. One of the primary advantages of impact surface 272 is to distribute the impaction forces of the material over the entire framework.

Figure 15:
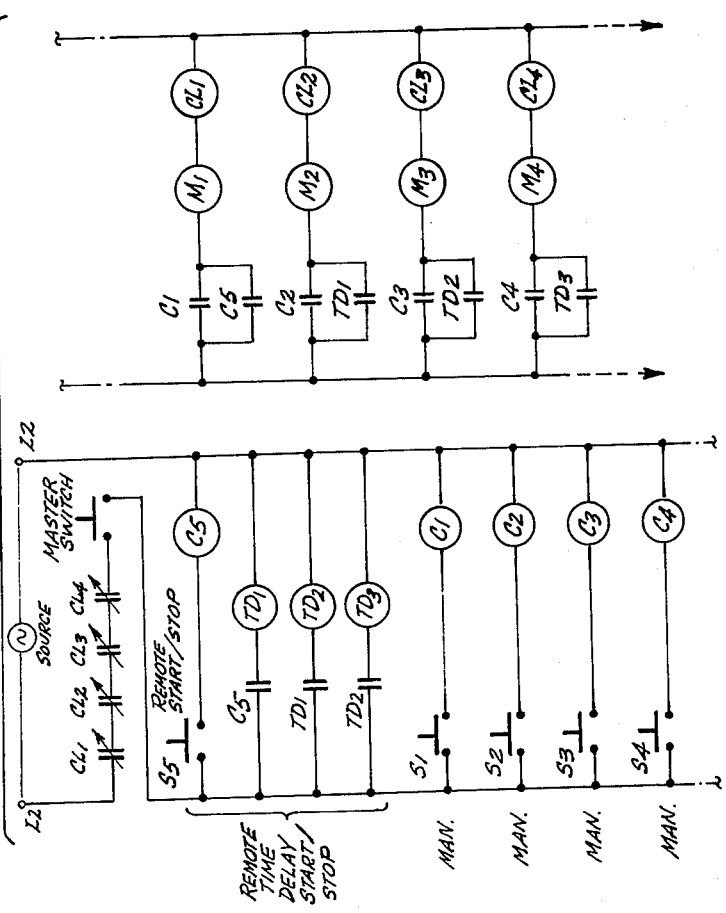
FIG. 15 (Sheet 1) is a control schematic for the electrical power system employed with the main conveyor spans of the present invention.

Referring now to FIG. 15 (Sheet 1), a preferred basic control schematic for the electric motors of the main conveyor span is shown. The control schematic shown includes four motors, M1, M2, M3 and M4. Each one of these motors corresponds to a drive motor for one conveyor section. For example, in the embodiment shown in FIG. 1, motor M1 would be driving the conveyor spans 20 and motor M2 would be driving main conveyor spans 22. Fur purposes of a complete description, two additional motors M3 and M4 are shown which would be included on main conveyor spans subsequent to span 22 shown in FIG. 1.

As shown, power is fed from an electrical energy source along two lines L1 and L2. Interposed in line L1 is a master switch which when closed feeds power to the remainder of the circuit. A manual start-stop switch is provided for each of the motor circuits. Switch S1 when closed will energize the coil of relay C1 in turn closing normally open contact of relay C1 to energize the motor M1. Similarly switches S2, S3 and S4 will energize motors M2, M3 and M4, respectively.

Also provide is a remote start-stop switch S5 which can be operated from a central location, for example, adjacent the swinger location. When switch S5 is closed the coil of relay C5 energizes normally open contact of relay C5 in the starter circuit and the normally open contact of the coil C5 in the circuit of motor M1. Thus motor M1 is energized. In addition the coil of the time delay relay TD1 is also energized. After delay of, for example seven seconds, the coil of time delay relay TD1 will cause the normally open contacts of time delay relay TD1 in the starter circuit to close and will also energize normally open contacts or relay TD1 in the circuit of motor M2. Thus motor M2 is energized. Simultaneously the coil of relay TD2 will be energized. After a period of, for example again seven seconds, motor M3 will be energized as well as the coil of a third time delay relay TD3. After a third delay, the motor circuit of motor M4 will be energized by the closing of normally open contacts of relay TD3. Thus the starting sequence of the motors M1, M2, M3 and M4 is serial, not requiring a large instantaneous amount of start-up current. This prevents line overload and also maintains starting costs at a minimum since the individual starting motor peaks are much less than the summation of the starting motor current peaks.

Included in each one of the motor circuits M1 through M4 are current limiting drop out sensor/relays CL1, CL2, CL3, and CL4. The current limiting sensor/-relays are designed to sense either overload or underload of each one of the motors M1 through M4 individually. For example, if too great a load is placed on a belt in the conveyor system, the current going to a given motor will rise beyond a predetermined limit. When this occurs, for example in motor M1, the coil of current limiting sensor/relay CL1 will be energized to open the normally closed contact of sensor/relay CL1 in line L1. Thus, power to the entire main conveyor system ceases, deenergizing all of the relays and shutting down the entire conveyor system. It is necessary to simultaneously shut down the entire conveyor system to prevent overload of the other given conveyor spans. Sensor/relays CL2 through CL4 operate in the same manner to prevent overload or underload of any one of the motors M2 through M4.

It is of course understood that the entire system can also be shut down by opening the master switch or by moving the remote start-stop switch S5 to its open position. In its open position, relay C5 will be deenergized opening the normally open contacts thereof in turn sequentially deenergizing the time delay relays.

The foregoing invention has been described in relation to a preferred embodiment. It is to be understood that various alterations, substitutions of equivalents and other changes can be made to the invention as described above by one of ordinary skill in the art without departing from the disclosed concept. It is intended, therefore, that the invention be limited only by the definition contained in the appended claims.

What is claimed is:

1. A modular conveyor system comprising:
a main conveyor span including a primary conveyor section formed from at least one modular conveyor segment, said conveyor segment including framework means for support, each segment carrying a plurality of sets of belt-supporting rollers, each said modular segment including four elongate spaced bars of substantially equal length spaced from and parallel to each other, said bars being trussed together to form a trestle segment, diagonally adjacent ends of said bars at one end of said segment having coupling means of a first type thereon, the remaining diagonally adjacent ends of said bars at said one end having coupling means of a second type thereon which are capable of mating with the coupling means of said first type, said bars with coupling means of said first type thereon having coupling means of said second type on the opposite ends thereof, said bars with coupling means of said second type at said one end having coupling means of said first type on the opposite ends thereof,
a head section having at least one set of belt-supporting rollers and having a belt return idler roller mounted on the end thereof, said head section including a frame having at one end thereof sets of first and second coupling means so arranged spatially to removably couple said first coupling means on said head section to said second coupling means on said primary section and to removably couple said second coupling means on said head section to said first coupling means on said primary section, thereby to removably connect said head section to an end of said primary section,
a tail section removably connected to the other end of said primary section, said tail section having at least one set of belt-supporting rollers and having a belt drive roller mounted on the end thereof, said tail section including a frame having at one end thereof sets of first and second coupling means so arranged spatially to removably couple said first coupling means on said tail section to said second coupling means on said primary section and to removably couple said second coupling means on said tail section to said first coupling means on said primary section, thereby to removably connect said tail section to an end of said primary section,
a continuous flexible belt engaging said belt idler roller on said head section and said drive roller on said tail section, said belt resting on said belt-supporting rollers,
means for supporting said primary, tail, and head sections,
means for driving said belt drive roller.

2. The system of claim 1 further comprising:
a pair of bars slidably mounted on said head section in substantially parallel, spaced relationship and extending generally longitudinally relative to said head section, said idler roller rotatably mounted at the ends of said bars,
retention means for holding said bars in a predetermined longitudinally extended position.

3. The system of claim 2 wherein said frame of said head section comprises at least two laterally spaced tubular members running horizonntally along the upper side of said frame, each of said pair of bars mounted for sliding movement in one of said spaced tubular members, said pair of bars having a plurality of laterally extending longitudinally spaced holes therein capable of receiving a retention pin for restraining said bars from longitudinaly inward movement.

4. The system of claim 2 further comprising:
power means for extending said bars in a longitudinally outward direction.

5. The system of claim 4 wherein said means for powering comprises a hydraulic cylinder means, and meaans for supplying said hydraulic cylinder means with hydraulic fluid to extend said bars, said meaans for supplying fluid being responsive to the material load on said belt.

6. The modular conveyor system of claim 1 further comprising a plurality of main conveyor spans each of which includes a primary conveyor section formed from at least one modular conveyor segment, each of said plurality of main conveyor spans including a head section and a tail section, and each of said plurality of main conveyor spans having continuous flexible belt and belt-supporting roller means thereon, said main conveyor spans being so arranged to serially transfer material from a first of said spans to at least one subsequent span, the tail sections of said spans being positioned over the head section of a next serially located main conveyor span, the tail section of the last serially located conveyor span being positioned over means for distributing material being conveyed.

7. In a conveyor distribution system, a mobile distribution conveyor span comprising:
- a central section having a plurality of belt-supporting rollers thereon, a head section having an idler return roller thereon, and a tail section having a drive roller thereon,
- a first ground-engaging vehicle,
- first mounting means for connecting said head section of said conveyor span to said first vehicle for sliding movement relative to the longitudinal dimension of said distribution span, said first mounting means including
- a first frame member having a plurality of load bearing rollers thereon, the head section of said distributionn span resting for longitudinal, sliding movement on said rollers,
- a second frame member,
- a third frame member pivotally connected along a vertical axis to said second frame member, one of said second and third frame members pivotally attached to said first frame member along a first axis transverse to said vertical axis, and
- a fourth frame member pivotally connected along a second axis to the other of said second and third frame members, said second axis being oriented transversely to said first axis and to said vertical axis,
- a second ground-engaging vehicle,
- second mounting means for connecting the tail section of said conveyor span to said second vehicle for rotation about an axis that is upright and transverse to the longitudinal dimension of said conveyor span,
- a continuous, flexible conveyor belt engaging said drive and idler rollers and supported on said support rollers, and
- drive means for said belt mounted on said conveyor span.

8. The system of claim 7 wherein said second means mounts said distribution span for rotation through an arc greater than 180°.

9. The system of claim 7 wherein said fourth frame member is connected to said first vehicle and comprises upper and lower portions pivotally connected to each other along a third axis parallel to said first axis,
- extensible means connected between said upper portion of the fourth frame member and said vehicle for adjusting and holding the fourth frame member in predetermined position about its second and third pivot axes.

10. The system of claim 7 wherein said second mounting means comprises:
- a first frame member connected to said distribution span,
- a support member affixed to said second vehicle,
- a ball and socket interconnecting said first frame member with said support member.

11. The system of claim 7 wherein said drive means for said belt on said distribution span comprises:
- a self-contained prime mover coupled to said drive roller by power transmission means.

12. A modular conveyor trestle section comprising:
- a plurality of rectangular trusses of substantially equal lengths having their elongate sides joined together, each end of the trestle section lying substantially in a plane perendicular to the plane of said trusses and having a rectangular shape, coupling means affixed to each end of said trestle section, said coupling means being of a first type on a given corner and being of an opposite type at the corresponding longitudinally opposite end corner, coupling means of said first type being located on one set of diagonal corners at both ends of said section and coupling means of said opposite type being located on the other set of diagonal corners at both ends of said trestle section, said coupling means of said first type capable of mating with coupling means of said opposite type to join together end to end a plurality of said trestle sections to form an integrated conveyor trestle,
- a plurality of belt-supporting roller means mounted on one side of trestle section.

13. The trestle section of claim 12 wherein said coupling means of said one type comprise a longitudinally extending flange having a hole laterally extending therethrough, said coupling means of said opposite type comprising a longitudinally extending yoke having a laterally extending hole therethrough, said coupling means further comprising a retention pin for insertion through said holes as they are mated when the ends of said trestle sections are aligned for interconnection, said retention pin attached to said trestle section by a flexible member.

14. A modular conveyor head section comprising:
- a trestle composed of a plurality of rectangular trusses of substantially equal length having their elongate sides joined together, one end of the trestle lying substantially in a plane perpendicular to the plane of said trusses, coupling means on said one end for removably joining said head section to a modular conveyor trestle section having corresponding coupling means thereon, said coupling means including a set of coupling means of a first type and a set of coupling means of a second type, said sets of coupling means being so arranged as to position said set of first type at diagonal corners of a rectangle and said set of second type at ends of an opposing diagonal of said rectangle, said first and second types of coupling means capable of mating with coupling means of second and first types, respectively, on a modular conveyor trestle section,
- a longitudinally extensible bracket means mounted on the other end of said trestle, said bracket means including a pair of elongate bars mounted on said trestle for sliding movement relative to the longitudinal dimension thereof,
- a belt return roller mounted for rotation on the outboard end of said pair of bars,
- means for mechanically restraining said bracket means in a plurality of longitudinally extended positions, and
- a plurality of belt-supporting roller means mounted on one side of said trestle for carrying said belt from said belt roller.

\* \* \* \* \*